United States Patent
Ota et al.

(10) Patent No.: US 7,749,935 B2
(45) Date of Patent: Jul. 6, 2010

(54) CATALYST CARRIER AND FUEL CELL USING THE SAME

(75) Inventors: Ken-ichiro Ota, Kanagawa (JP); Akimitsu Ishihara, Kanagawa (JP); Satoshi Iinou, Nagano (JP); Akinori Sudoh, Nagano (JP)

(73) Assignee: Showa Denko K.K., Tokyo (JP)

( * ) Notice: Subject to any disclaimer, the term of this patent is extended or adjusted under 35 U.S.C. 154(b) by 985 days.

(21) Appl. No.: 11/041,972

(22) Filed: Jan. 26, 2005

(65) Prior Publication Data

US 2005/0245390 A1 Nov. 3, 2005

Related U.S. Application Data

(60) Provisional application No. 60/541,505, filed on Feb. 4, 2004.

(30) Foreign Application Priority Data

Jan. 27, 2004  (JP) ............................. 2004-018879

(51) Int. Cl.
- *B01J 21/18* (2006.01)
- *B01J 23/00* (2006.01)
- *B01J 23/40* (2006.01)
- *D01F 9/12* (2006.01)

(52) U.S. Cl. .................. 502/185; 502/180; 502/182; 423/447.1; 423/447.2; 977/742; 977/844

(58) Field of Classification Search ............... 502/180, 502/182, 185; 423/447.1, 447.2; 977/742, 977/844

See application file for complete search history.

(56) References Cited

U.S. PATENT DOCUMENTS

| | | | |
|---|---|---|---|
| 5,409,775 A | * | 4/1995 | Harada et al. ............... 428/367 |
| 5,413,866 A | * | 5/1995 | Baker et al. ............... 423/447.2 |
| 5,643,670 A | * | 7/1997 | Chung ........................ 428/367 |
| 6,689,505 B1 | | 2/2004 | Albers et al. |
| 6,730,398 B2 | * | 5/2004 | Morita et al. ................ 428/367 |
| 7,041,847 B2 | * | 5/2006 | Haake et al. ................. 562/487 |
| 7,306,828 B2 | * | 12/2007 | Barrera et al. ............... 427/427 |
| 2003/0198588 A1 | * | 10/2003 | Muramaki et al. ........ 423/447.3 |
| 2004/0197638 A1 | * | 10/2004 | McElrath et al. .............. 429/44 |
| 2005/0042163 A1 | * | 2/2005 | Allison et al. ............. 423/447.3 |
| 2005/0135982 A1 | * | 6/2005 | Pavlovsky ................ 423/239.1 |
| 2006/0002844 A1 | * | 1/2006 | Suenaga et al. .......... 423/447.3 |

FOREIGN PATENT DOCUMENTS

| EP | 1 309 024 A2 | 5/2003 |
|---|---|---|
| EP | 1710014 A1 * | 10/2006 |
| JP | 1-119340 | 5/1989 |

(Continued)

*Primary Examiner*—Patricia L Hailey
(74) *Attorney, Agent, or Firm*—Sughrue Mion, PLLC

(57) ABSTRACT

A catalyst carrier, being characterized in that a catalyst metal for promoting an oxidation-reduction reaction is carried on a vapor-grown carbon fiber having an average outer diameter of from 2 nm to 500 nm, which has been subjected to a crushing treatment so as to have a BET specific surface area of from 4 $m^2/g$ to 100 $m^2/g$ and an aspect ratio of from 1 to 200, and exhibiting high activity per unit amount of a catalyst metal, a low reaction resistance and an improved output density, and is useful for a fuel cell; a production method thereof and a fuel cell using the catalyst carrier.

11 Claims, 12 Drawing Sheets

FOREIGN PATENT DOCUMENTS

| | | | |
|---|---|---|---|
| JP | 6-81218 | | 3/1994 |
| JP | 06-081218 | * | 3/1994 |
| JP | 7-262997 | | 10/1995 |
| JP | 8-117598 | | 5/1996 |
| JP | 2001-357857 | | 12/2001 |
| JP | 2003-200052 | | 7/2003 |
| JP | 2003-246613 | * | 9/2003 |
| JP | 2003-317742 | | 11/2003 |
| WO | WO 02/49412 A1 | | 6/2002 |

* cited by examiner

CATALYST CARRIER AND FUEL CELL USING THE SAME

CROSS REFERENCE TO THE RELATED APPLICATIONS

This is an application filed pursuant to 35 U.S.C. Section 111(a) with claiming the benefit of U.S. Provisional application Ser. No. 60/541,505 filed Feb. 4, 2004 under the provision of 35 U.S.C. Section 111(b), pursuant to 35 U.S.C. Section 119(e) (1).

TECHNICAL FIELD

The present invention relates to a catalyst carrier. More particularly, the present invention relates to a catalyst carrier, which can be used as an electrode catalyst of a fuel cell, wherein a catalyst metal is carried on a carbon fiber; a production method for the catalyst carrier; and a fuel cell using the catalyst carrier.

BACKGROUND ART

A solid polymer type fuel cell is attracting attention to be used for a cell automobile and a portable power supply since it is compact and can obtain a high current density when operated at room temperature compared with a phosphoric-acid type fuel cell and a molten carbonate type fuel cell. Further, many proposals on components, system compositions and the like in such fields have been made. A stack structure of a conventional solid polymer type fuel cell is a sandwich structure of, for example, separator/electrode (oxygen electrode)/electrolyte membrane/electrode (hydrogen electrode)/separator. Required characteristics of an electrode for this fuel cell are to prevent the electrode from poisoning by carbon monoxide and to enhance activity per unit amount of a catalyst metal. For the purpose of preventing such poisoning and enhancing the activity, many trials have been made to date on metals or alloys thereof to be used as catalysts as described in JP-A-2001-85020 (U.S. Pat. No. 6,689,505), which describes that a particle size of a catalyst is preferably several nm.

On the other hand, as for carbon to be used for a carrier, particulate carbon such as ordinary carbon black is used as described in JP-A-8-117598, JP-A-2003-201417 (EP 1309024) and JP-A-2001-357857. However, since the contact between carbon particles is conducted by a point contact, there is a problem that resistance is large and gas permeability is insufficient. In order to solve these problems, it has been considered effective to change the particulate carbon to fiber carbon to be used for the carrier as described in JP-A-7-262997, JP-A-2003-317742 and JP-A-2003-200052.

As for carbon fibers, a vapor-grown carbon fiber, a carbon nanotube and a PAN type carbon fiber are known. However, in any of reports which have been made public to date, a technique to produce an electrode comprising a carbon fiber on which fine catalyst particles are uniformly carried with a high density has not been described.

DISCLOSURE OF THE INVENTION

An object of the present invention is to provide a vapor-grown carbon fiber capable of enhancing an activity per unit amount of a catalyst metal, reducing a reaction resistance and enhancing an output density and appropriate as a catalyst carrier and the like, a catalyst carrier carrying a metal catalyst, production methods thereof and an application thereof for a fuel cell.

The present invention provides a catalyst carrier, a production method and an application thereof as follows:

1. A catalyst carrier, being characterized in that a catalyst metal for promoting an oxidation-reduction reaction is carried on a vapor-grown carbon fiber having an average outer diameter of from 2 nm to 500 nm, which has been subjected to a crushing treatment so as to have a BET specific surface area of from 4 $m^2/g$ to 100 $m^2/g$ and an aspect ratio of from 1 to 200.

2. The catalyst carrier as described in 1 above, wherein a ratio of an average fiber length after the crushing treatment to an average fiber length before the crushing treatment is 0.8 or less.

3. The catalyst carrier as described in 1 or 2 above, wherein a ratio of a specific surface area after the crushing treatment to a specific surface area before the crushing treatment is 1.1 or more.

4. The catalyst carrier as described in any of 1 to 3 above, wherein the vapor-grown carbon fiber is a carbon fiber comprising a branched vapor-grown carbon fiber;

5. The catalyst carrier as described in any of 1 to 4 above, wherein the catalyst metal is at least one metal selected from the group consisting of platinum and transition metals belonging to the groups IV and V in the periodic table or any one of alloys thereof.

6. A production method for a catalyst carrier, being characterized in that a catalyst metal for promoting an oxidation-reduction is supported on a vapor-grown carbon fiber having an average outer diameter of from 2 nm to 500 nm, which has been obtained by thermally decomposing hydrocarbon, or a vapor-grown carbon fiber obtained by performing a thermal treatment of the thus-obtained vapor-grown carbon fiber at a temperature of from 600° C. to 1300° C. in an atmosphere of an inert gas, which have been crushed so as to have a BET specific surface area of from 4 $m^2/g$ to 100 $m^2/g$ and an aspect ratio of from 1 to 200.

7. The production method for the catalyst carrier as described in 6 above, wherein support of the catalyst metal is performed by a liquid phase reduction method.

8. The production method for the catalyst carrier as described in 6 or 7 above, wherein, after being crushed, the vapor-grown carbon fiber is subjected to a thermal treatment at a temperature of from 2000° C. to 3000° C. in an atmosphere of an inert gas.

9. The production method for the catalyst carrier as described in 6 or 7 above, wherein, before being crushed, the vapor-grown carbon fiber is subjected to a thermal treatment at a temperature of from 2000° C. to 3000° C. in an atmosphere of an inert gas.

10. The production method for the catalyst carrier as described in any of 6 to 9 above, wherein such crushing is performed by dry crushing using an impact force.

11. The production method for the catalyst carrier as described in 10 above, wherein crushing is performed in an atmosphere containing oxygen in a concentration of 5% by volume or more.

12. A catalyst carrier obtained by the method as described in any of 6 to 11 above.

13. An electrode material, wherein a catalyst layer comprising a catalyst carrier as described in any of 1 to 5 and 12 above is formed on an electrically conductive base material.

14. A membrane electrode assembly for a fuel cell, which comprises an electrode wherein a catalyst layer and a gas diffusion layer are provided on both faces of an electrolyte membrane, being characterized in that the catalyst layer comprises the electrode material as described in 13 above.

15. A cell of a fuel cell, comprising the membrane electrode assembly for the fuel cell as described in 14 above which is sandwiched by separators.

16. A fuel cell, comprising two or more of the cells for the fuel battery as described in 15 above being laminated one on another.

Further, the present invention also relates to a vapor-grown carbon fiber as follows:

17. A vapor-grown carbon fiber, being characterized by having on its surface a physical site capable of carrying a catalyst metal.

18. The vapor-grown carbon fiber as described in 17 above, wherein the physical site is a defect generated by a chemical and/or physical action.

19. The vapor-grown carbon fiber as described in 18 above, wherein the physical action is an action by an impact and/or shearing force.

MODE FOR CARRYING OUT THE INVENTION

Hereinafter, the present invention will be described in detail.

A vapor-grown carbon fiber to be used as a carrier of a catalyst carrier of the present invention has an average outer diameter of from 2 to 500 nm and has been subjected to a crushing treatment so as to have a BET specific surface area of from 4 to 500 $m^2/g$ and an aspect ratio of from 1 to 200. Preferably, the average outer diameter is from 15 to 200 nm; the BET specific surface area is from 10 to 200 $m^2/g$; and the aspect ratio is from 2 to 150. Further, preferably, an average fiber length is from 2 to 100 μm. By using as a carrier the vapor-grown carbon fiber which has been subjected to the crushing treatment so as to have properties within the respective ranges as described above, when a catalyst metal is carried thereon, the carrier is capable of carrying the catalyst metal while being in a state of particles having a small diameter and a large specific surface area and, as a result, a catalytic activity can be enhanced.

The crushing treatment has preferably been performed such that an average fiber length after the treatment becomes 0.8 or less when the average fiber length before the treatment is taken as 1. Further, the crushing treatment has preferably been performed such that a BET specific surface area after the treatment becomes 1.1 or more and, more preferably, 1.4 or more, when the BET specific surface area before the treatment is taken as 1.

The vapor-grown carbon fiber to be used in the present invention preferably contains a branched carbon fiber, and thereby an electric conductive pass of the carbon fiber is formed and, accordingly, electric conductivity as the catalyst carrier can be enhanced.

The vapor-grown carbon fiber to be used in the present invention is prepared by subjecting a fine carbon fiber produced by a vapor phase method to a crushing treatment. Performing the crushing treatment enables to produce a fine carbon fiber having a multi-layer structure, which comprises a discontinuous surface of a graphene sheet having a fracture surface at an end portion of the fiber; a continuous surface formed by combining an end portion of at least one graphene sheet with an end portion of an adjacent graphene sheet; and a hollow space in a center axis. By such a structure as described above, electric resistance of the carbon fiber is reduced and electric conductivity as a catalyst carrier is enhanced.

Characteristics of the fine carbon fiber are described with reference to FIGS. 1 to 10. In these figures, graphene sheets (layers of graphite or crystals similar to graphite) are schematically shown in solid lines.

Figure 1:
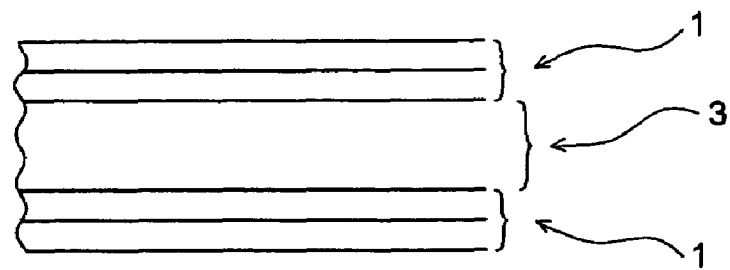
FIG. 1 is a schematic vertical cross-sectional diagram showing a structure in the vicinity of an end portion of a conventional fine carbon fiber.
Figure 2:
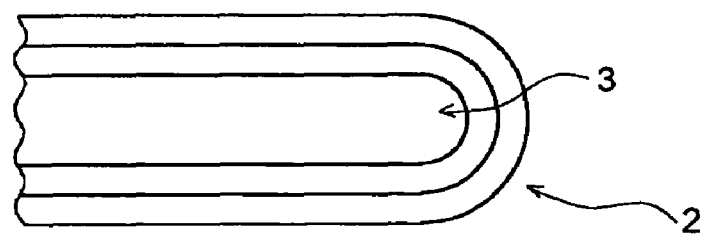
FIG. 2 is a schematic vertical cross-sectional diagram showing a structure in the vicinity of an end portion of another conventional fine carbon fiber.

As shown in a schematic vertical cross-sectional diagram according to FIG. 1 or 2, the fine carbon fiber comprises a discontinuous surface (1) of a graphene sheet having a fracture surface or a closed surface (2) having a continuous surface of the graphene sheets at the end portion of a fiber, and a hollow space (3).

Figure 3:
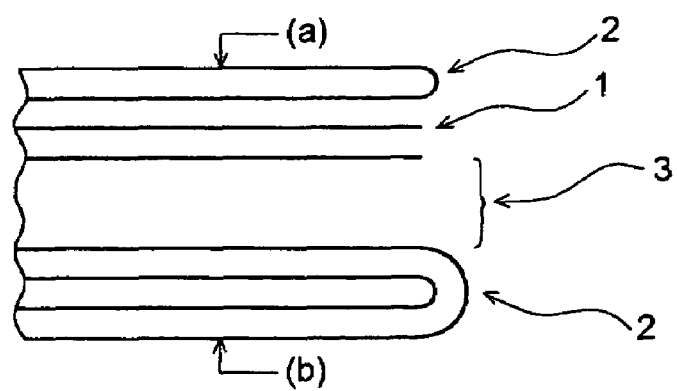
FIG. 3 is a schematic vertical cross-sectional diagram for explaining a structure in the vicinity of an end portion of a fine carbon fiber to be used in the present invention.
Figure 4:
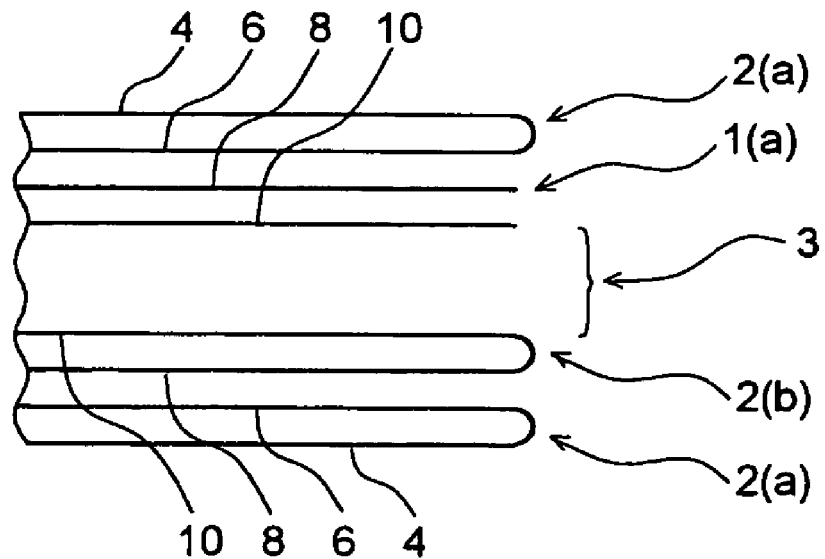
FIG. 4 is a schematic vertical cross-sectional diagram for explaining a structure in the vicinity of an end portion of a fine carbon fiber to be used in the present invention.

On the other hand, as shown in a schematic cross-sectional diagram according to FIG. 3 or 4, a preferred mode of the fine carbon fiber according to the invention is such a fine carbon fiber having a hollow space (3) produced by a vapor phase method, which comprises a discontinuous surface (1) of a graphene sheet having a fracture surface at an end portion of the fiber and a continuous surface (2) formed by combining an end portion of at least one graphene sheet and an end portion of an adjacent graphene sheet. The fracture surface denotes a plane generated by crushing or the like. Continuity of the graphene sheets is broken at the fracture surface, to thereby allow an edge carbon atom at a fracture portion inside a basal surface, an edge carbon atom at a border portion of a crystallite or the like to appear. The fracture surface is, for example, an end surface at approximately right angles to a center axis of the carbon fiber. Even in the fiber having a low aspect ratio (1 to 200), the hollow space and a multi-layer structure (growth ring structure) are maintained.

The carbon fiber according to FIG. 3 has a closed surface (2) having two continuous surfaces of the graphene sheets; in one portion (a), two adjacent graphene sheets are combined with each other at respective end portions, while, in the other portion (b), among adjacent four graphene sheets, outermost two graphene sheets are combined with each other at end portions, while inner two graphene sheets are combined with each other at end portions, respectively. The discontinuous surface (1) of the graphene sheet is present at the side of a hollow space (3) adjacent to the portion (a).

The carbon fiber according to FIG. 4 is a carbon fiber comprising four layers (4, 6, 8, 10) of graphene sheets; outer two layers of the graphene sheets (4, 6) form continuous surfaces (2(a)) in which end portions thereof are combined with each other all over the circumference, while inner two layers of the graphene sheets (8, 10) simultaneously form a closed portion (2(b)) having a continuous surface in which end portions thereof are combined with each other and a portion (1(a)) in which end portions thereof have a discontinuous surface.

Figure 5:
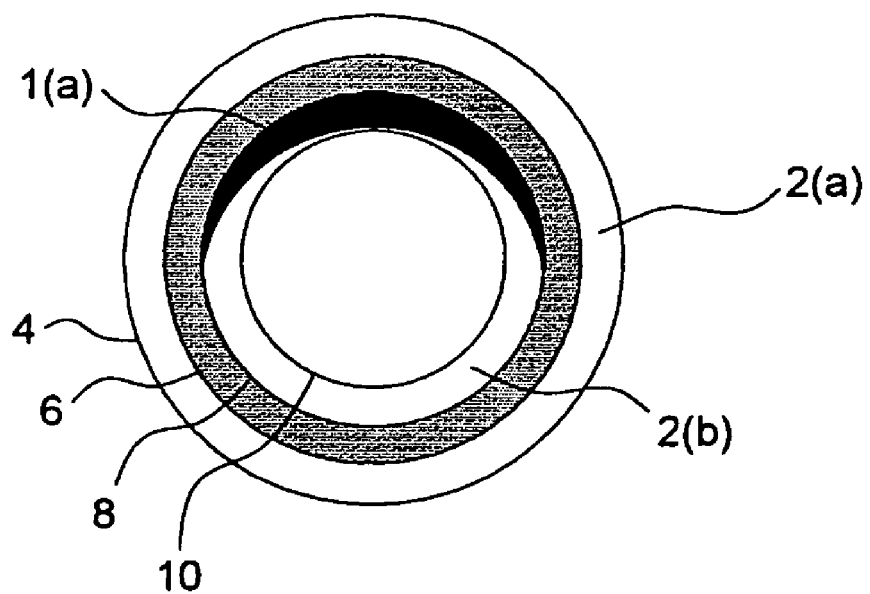
FIG. 5 is a schematic side view seen from a direction of an end portion of the fiber according to FIG. 4.

FIG. 5 is a schematic side view of the carbon fiber having the structure according to FIG. 4 seen from a direction of the end portion thereof. White portions show continuous surfaces (2(a), 2(b)), while a black portion shows a discontinuous surface (1(a)). A center portion is a hollow portion, while a grey portion shows an interface between graphene sheets (6) and (8). A continuous surface of the graphene sheets which is present at an end of the fine carbon fiber is continuous also in the direction of the circumference; however, it is considered that the discontinuity may be generated also in the direction of the circumference by an influence of a defect caused by crushing, a thermal treatment temperature, an impurity component other than carbon, etc.

Figure 6:
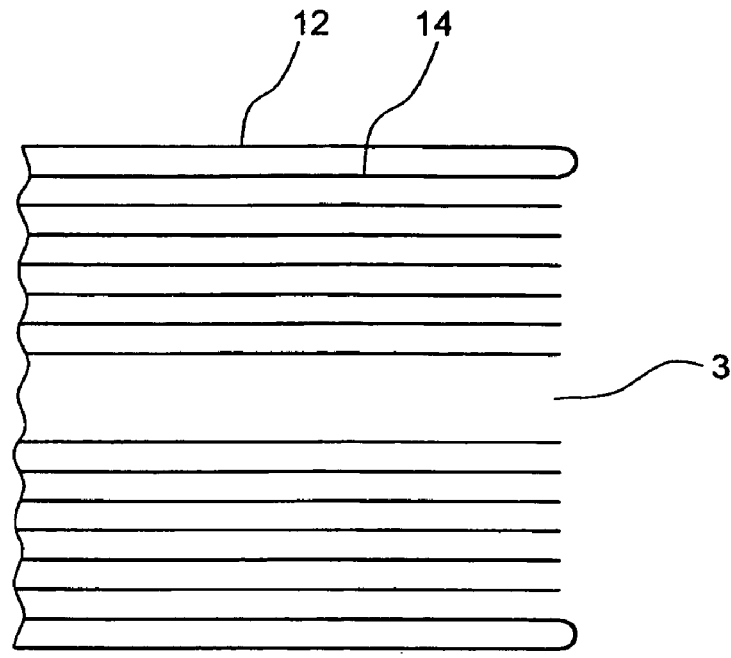
FIG. 6 is a schematic vertical cross-sectional diagram for explaining a structure in the vicinity of an end portion of a fine carbon fiber to be used in the present invention.
Figure 7:
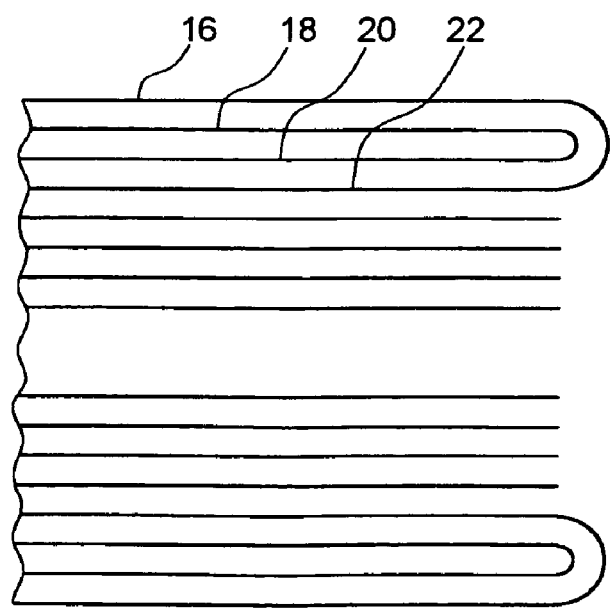
FIG. 7 is a schematic vertical cross-sectional diagram for explaining a structure in the vicinity of an end portion of a fine carbon fiber to be used in the present invention.
Figure 8:
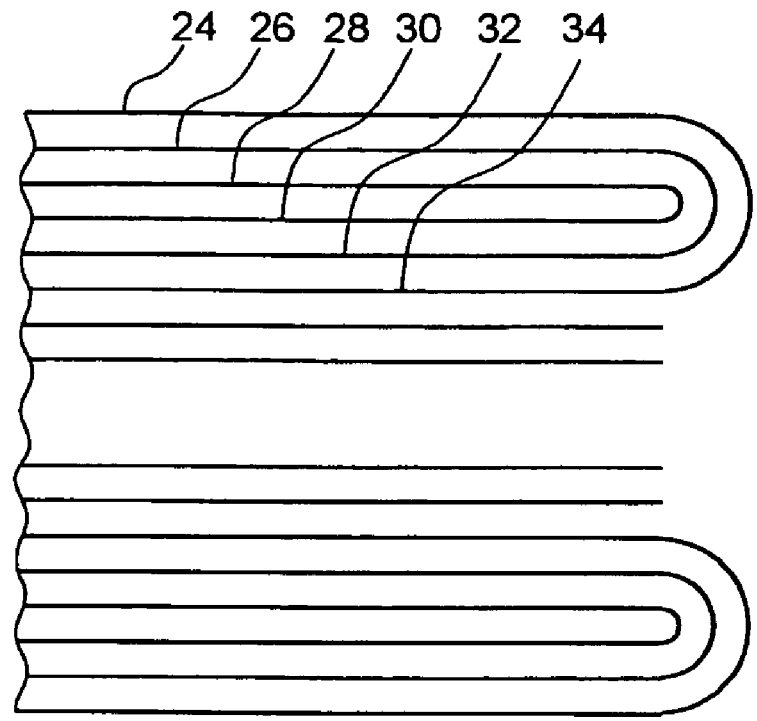
FIG. 8 is a schematic vertical cross-sectional diagram for explaining a structure in the vicinity of an end portion of a fine carbon fiber to be used in the present invention.

Each of FIGS. 6 to 8 shows a carbon fiber comprising eight layers of the graphene sheets.

In FIG. 6, outer two layers of the graphene sheets (12, 14) form a continuous surface in which end portions thereof are combined with each other all over the circumference, while each of the other six layers of the graphene sheets form a discontinuous surface.

In FIG. 7, an outermost layer of the graphene sheet (16) and the fourth from the outermost layer of the graphene sheet (22), and the second and the third layers from the outermost layer of the graphene sheet (18, 20) which are adjacent to each other are combined with each other respectively at the end portions to form continuous surfaces all over the circumference, while each of the other four layers of the graphene sheets form a discontinuous surface.

In FIG. 8, an outermost layer of the graphene sheet (24) and the sixth layer from the outermost layer of the graphene sheet (34), the second and fifth layers from the outermost layer of the graphene sheet (26, 32), and the third and fourth layers from the outermost layer of the graphene sheet (28, 30) which are adjacent to each other are combined with each other respectively at the end portions to form continuous surfaces all over the circumference, while each of the other two layers of the graphene sheets form a discontinuous surface.

Figure 9:
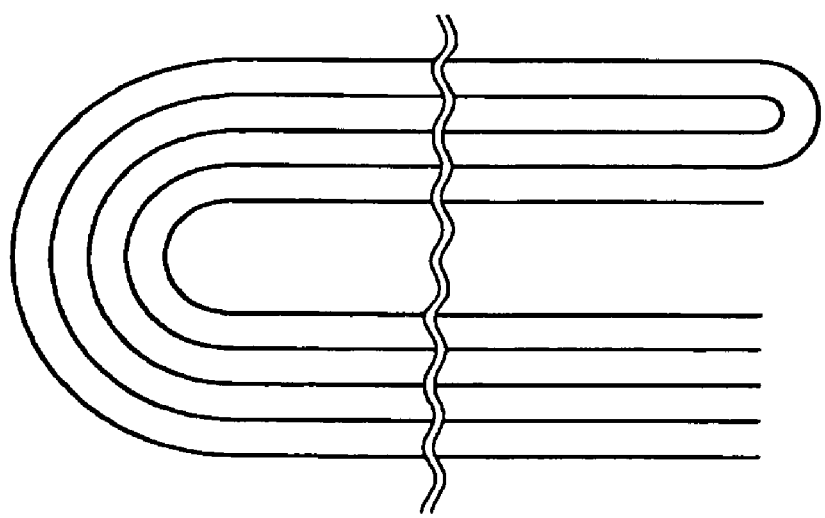
FIG. 9 is a schematic vertical cross-sectional diagram for explaining structures in the vicinities of both end portions of a fine carbon fiber to be used in the present invention.
Figure 10:
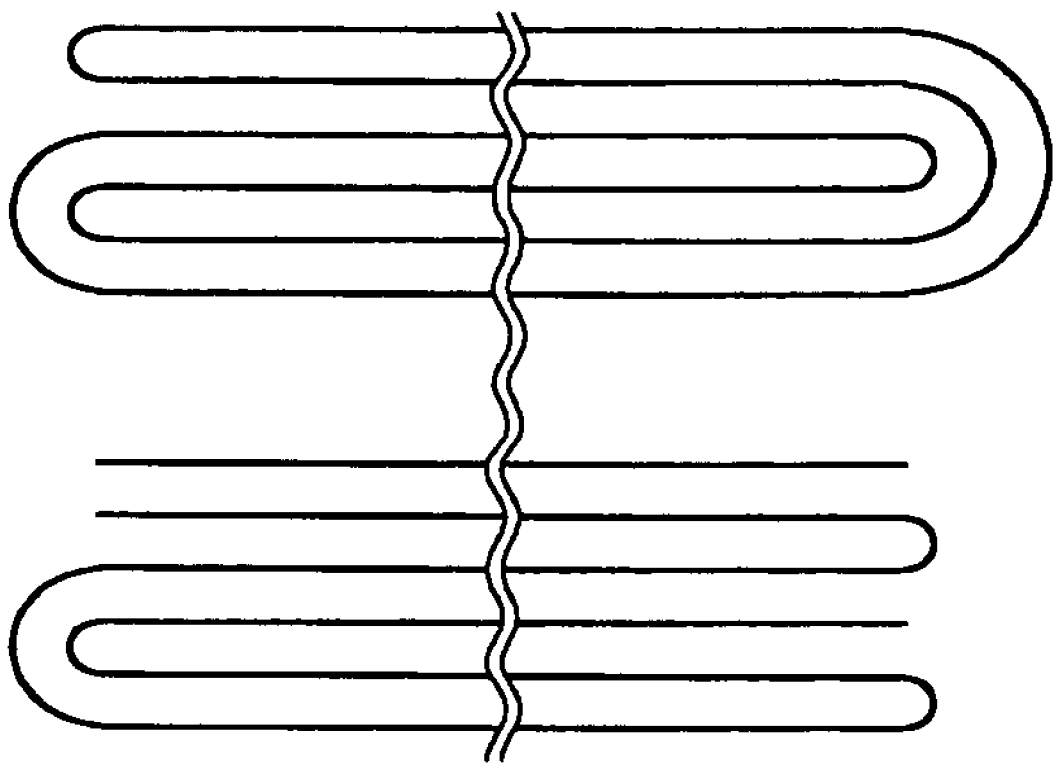
FIG. 10 is a schematic vertical cross-sectional diagram for explaining structures in the vicinities of both end portions of a fine carbon fiber to be used in the present invention.

Each of FIGS. 9 and 10 shows an entire picture of a fine carbon fiber. FIG. 9 shows a mode in which one end of the fiber forms only continuous surfaces in the same manner as conventional and the other end has both continuous and discontinuous surfaces, while FIG. 10 shows a mode in which both ends of the fiber have both continuous and discontinuous surfaces.

The continuous surface which exists in the same surface as the fracture surface shows a surface in which a defect is generated in the graphene sheet laminated by thermal chemical vapor deposition and, accordingly, the graphene sheet has lost the regularity and is combined with an adjacent graphene sheet; or a fracture end of a graphene sheet is recombined with an end of another graphene sheet by a high temperature treatment of 2000° C. or more. A curved portion of the continuous surface comprises one or more of graphene sheets; however, in a case in which the number of the laminated graphene sheets is small, namely, in a case in which a curvature radius of such curved graphene sheets is small, the fiber is hard to stably exist since a surface energy of the curved portion is large, and therefore, the number of the laminated graphene sheets at the curved portion is preferably three more, more preferably five or more and, particularly preferably, five to ten.

The vapor-grown carbon fiber used in the present invention can be produced by crushing a vapor-grown carbon fiber produced by a vapor phase method and, preferably, a carbon fiber comprising a branched carbon fiber (produced by a method as described in, for example, JP-A-2002-266170 (WO02/49412)).

The vapor-grown carbon fiber to be used in such production can ordinarily be obtained by thermally decomposing an organic compound while using an organic transition metal compound as a catalyst. The organic compound which can serve as a raw material for the carbon fiber is a compound selected from among toluene, benzene, naphthalene, gases such as ethylene, acetylene, ethane, a natural gas, carbon monoxide and the like and mixtures thereof. Thereamong, aromatic hydrocarbons such as toluene and benzene are preferred. The organic transition metal compound is an organic compound containing a transition metal which can be a catalyst, specifically, any one of metals belonging to the groups IV to X in the periodic table. Particularly, compounds such as ferrocene and nickelocene are preferred.

The carbon fiber is, preferably, a carbon fiber in which an interlayer distance ($d_{002}$) of a hexagonal carbon layer (002) by an X-ray diffractometry is 0.345 nm or more, a ratio (Id/Ig) of a peak height (Id) of the band at 1341 to 1349 $cm^{-1}$ to a peak height (Ig) of the band at 1570 to 1578 $cm^{-1}$ in a Raman scattering spectrum is 1 or more. In this case, Id denotes a broad band region corresponding to an increase of irregularity of a carbon structure, while Ig denotes a relatively sharp band region associated with a perfect graphite structure.

Raw materials to be crushed can be subjected to a thermal treatment at 600 to 1300° C. in order to remove an organic substance such as tar attached on a surface of the carbon fiber obtained by thermal decomposition.

As for crushing methods, a rotary crusher, a high-speed mill, a ball mill, a medium stirring mill, which adopts a method of crushing the fiber using an impact force, a jet crusher and the like can be utilized. Particularly, a vibrating mill such as a circular vibrating mill, a gyratory vibrating mill or a centrifugal mill is preferred. As for crushing media, ceramics balls of alumina, zirconia, silicon nitride and the like, or metal balls of stainless steel and the like can be used.

Among these, stainless steel balls which can be removed by a high-temperature thermal treatment are preferred.

Further, it is advantageous to perform a dry type crushing in the absence of water and/or an organic solvent, since it is not necessary to perform a post-treatment step such as removing a dispersant after the crushing, drying the solvent or crushing a dry coagulated fiber.

The crushing is preferably performed in an atmosphere having an oxygen concentration of 5% by volume or more. By allowing oxygen to be present in a volume of 5% or more, a surface of a crushed carbon fiber is modified, to thereby facilitate a catalyst metal to be carried. The crushing is preferably performed in the air.

Further, in a pretreatment or a post-treatment of the crushing, a graphitization treatment can be performed for the purpose of enhancing electric conductivity of the vapor-grown carbon fiber. The graphitization treatment can be performed by carrying out a thermal treatment at 2000 to 3000° C. in an atmosphere of an inert gas.

The catalyst carrier according to the present invention comprises a crushed vapor-grown carbon fiber and a catalyst metal for promoting an oxidation-reduction reaction carried on the carbon fiber.

Catalyst metals for promoting the oxidation-reduction reaction are at least one element selected from the group consisting of transition metals belonging to the groups IV and V in the periodic table comprising platinum and other platinum metal elements or mixtures thereof, preferably, platinum metal elements (nickel, palladium and platinum) or an alloy containing these metal elements.

A method for carrying the catalyst metal on the crushed vapor-grown carbon fiber is not particularly limited and is performed by, for example, a liquid phase reduction method. An example in which fine platinum particles are carried on the crushed vapor-grown carbon fiber by the liquid reduction method is described below.

Firstly, the crushed carbon fiber is dispersed in a distilled water and a pH value of the resultant dispersion is adjusted by using, for example, sodium carbonate. A dispersion operation can be performed by, for example, an ultrasonic wave treatment while confirming a dispersion condition by, for example, visual observation. Since the vapor-grown carbon fiber is high in hydrophobicity, it is preferable to enhance hydrophilicity by performing a surface treatment (hereinafter, referred to also as "hydrophilization treatment") on the carbon fiber in advance and, by this treatment, a specific surface area of the catalyst metal to be carried can be improved. The surface treatment can be performed in, for example, an acid solution (such as an aqueous nitric acid solution) for one to ten hours at 60 to 90° C.

To the resultant carbon fiber dispersion, an aqueous solution of chloroplatinic acid is added, thoroughly stirred and, then, an excess amount of a reducing agent such as formaldehyde is added to allow a reaction to proceed and, thereafter, a solid article is recovered by filtration. By drying the thus-recovered solid article in an atmosphere of an inert gas such as argon at 120 to 500° C., a catalyst carrier can be obtained in which platinum fine particles are carried on the vapor-grown carbon fiber.

The catalyst carrier according to the present invention is a catalyst carrier in which fine catalyst metal particles are carried on a vapor-grown carbon fiber as a carrier and has an improved catalyst activity per unit amount of the catalyst metal compared with a case in which a carrier in powder form such as carbon black is used. Further, by using the vapor-grown carbon fiber subjected to a crushing treatment, a grain diameter of the catalyst metal particles to be carried comes to be apparently small compared with a case in which the crushing treatment is not performed (namely, the specific surface area of the catalyst metal comes to be large). Specifically, it is possible to allow an average grain diameter of the catalyst metal to be carried to be 15 nm or less and, further, 10 nm or less, which enables to enhance the catalyst activity of the catalyst support and to obtain favorable characteristics for use in the electrode catalyst for the fuel cell.

The catalyst carrier according to the present invention can be applied for an electrode material, a membrane electrode assembly for a fuel battery, a cell for a fuel battery and a fuel battery and these articles can be produced by a known method.

The electrode material according to the present invention can be produced by forming a catalyst layer containing the above-described catalyst carrier on an electrically conductive base material such as carbon paper, carbon fiber woven fabric or carbon non-woven fabric. Formation of the catalyst layer can be performed by, for example, applying a slurry containing the catalyst carrier on an electrically conductive base material and, then, drying the resultant base material. The membrane electrode assembly for the fuel cell according to the present invention can be produced by thermally press-adhering the above-described electrode material comprising a gas diffusion layer and a catalyst layer on both surfaces of an electrolyte membrane. In a case in which the fuel cell is of a solid polymer type, the electrolyte membrane comprises a polymer material and, for example, a perfluorosulfonic acid type polymer can be used. A fuel cell can be prepared by sandwiching the membrane electrode assembly by separators having electric conductivity and two or more layers of such cell units are laminated one on another, to thereby prepare a fuel cell stack having a high output. Further, in order to suppress a leakage of an inner gas, it is also possible to provide a gasket between the electrolyte material and each of the separators.

BEST MODE FOR CARRYING OUT THE INVENTION

Hereinafter, the present invention will specifically be described with reference to representative examples; however, these examples are given for an illustrative purpose only and by no means limit the invention.

Further, a ratio of an average fiber length was determined by obtaining average fiber lengths before and after carbon fibers were subjected to a crushing treatment in a cross-sectional photograph of carbon fibers by a transmission electron microscope (TEM). Further, a specific surface area was measured in accordance with a BET method which is an ordinary measuring method of the specific surface area by using a specific surface area measuring apparatus "NOVA-1200" manufactured by Yuasa-Ionics Co., Ltd.

Example 1

Figure 11:
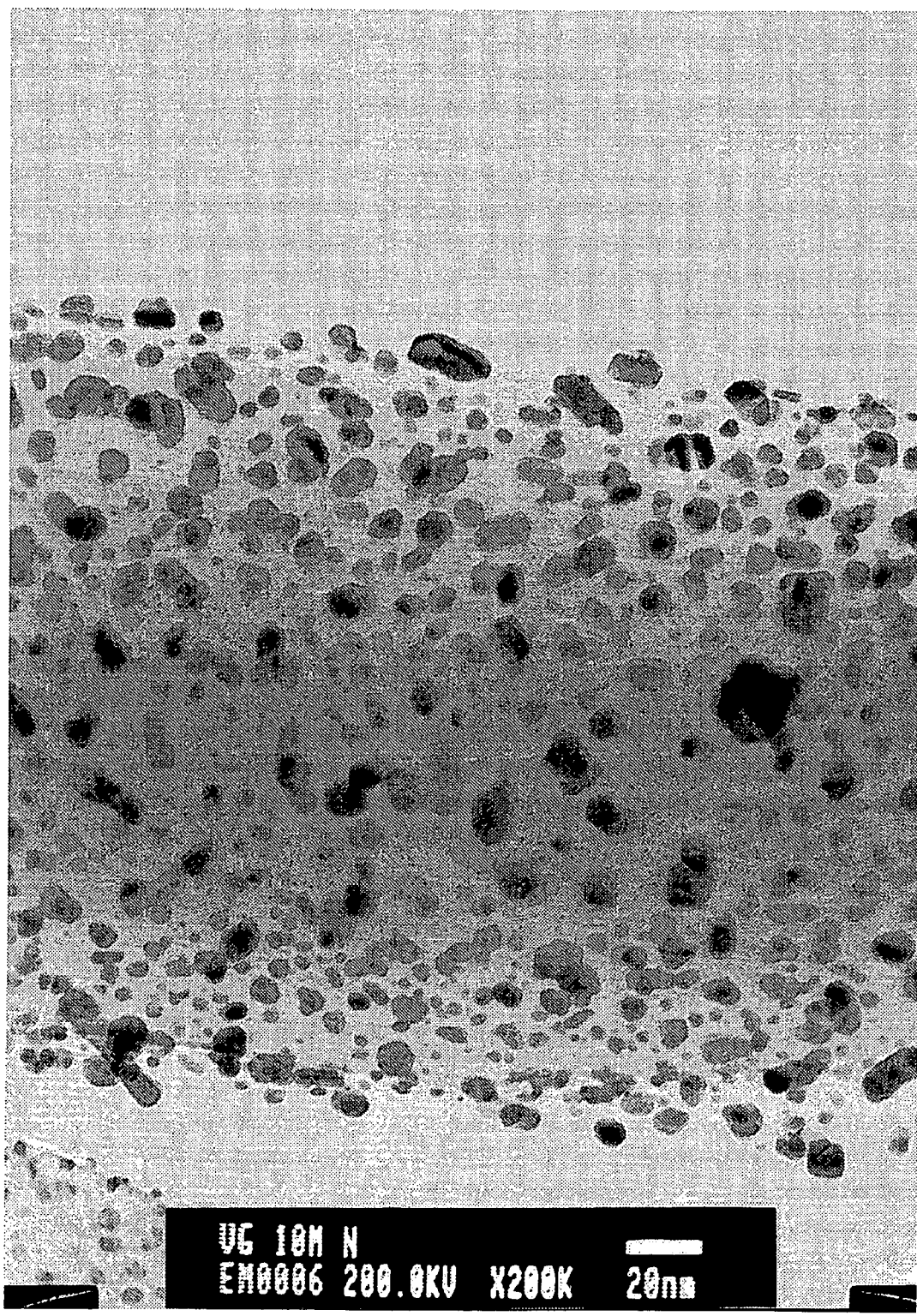
FIG. 11 is a transmission electron micrograph of the catalyst carrier according to Example 1.

5 g of vapor-grown carbon fiber having an average outer diameter of 150 nm, a specific surface area of 13 $m^2/g$ and an average fiber length of 10 μm was loaded in a rotary crusher (stainless steel-made crushing blade, rotation rate: 25000 rpm) and subjected to a crushing treatment for 10 minutes. Thereafter, a specific surface area and an average fiber length of the carbon fiber were measured and, as a result, the specific surface area and the average fiber length were 18 $m^2/g$ and 7.5 μm, respectively, which were 1.6 times and 0.75 times the original values, respectively. 0.2 g of the thus-crushed vapor-grown carbon fiber was dispersed in 50 ml of distilled water, 0.172 g of sodium carbonate was added and then, stirred with heat at 80° C. To the resultant dispersion, an aqueous solution containing 0.135 g of chloroplatinic acid was added dropwise, stirred for two hours and, then, a 35% aqueous solution of formaldehyde was added dropwise. After stirred for one hour, the resultant solution was filtered and, then, a solid material was subjected to a drying treatment for two hours at 400° C. in an atmosphere of argon, to thereby obtain a catalyst carrier in which a platinum grain was carried on a carbon fiber. A transmission electron microscope (TEM) photograph thereof is shown in FIG. 11.

Further, diameters of the platinum catalyst were measured by observing the TEM photograph, to thereby obtain a distribution of the diameters. As a result, an average diameter of the platinum catalyst particles was 8 nm.

Example 2

Figure 12:
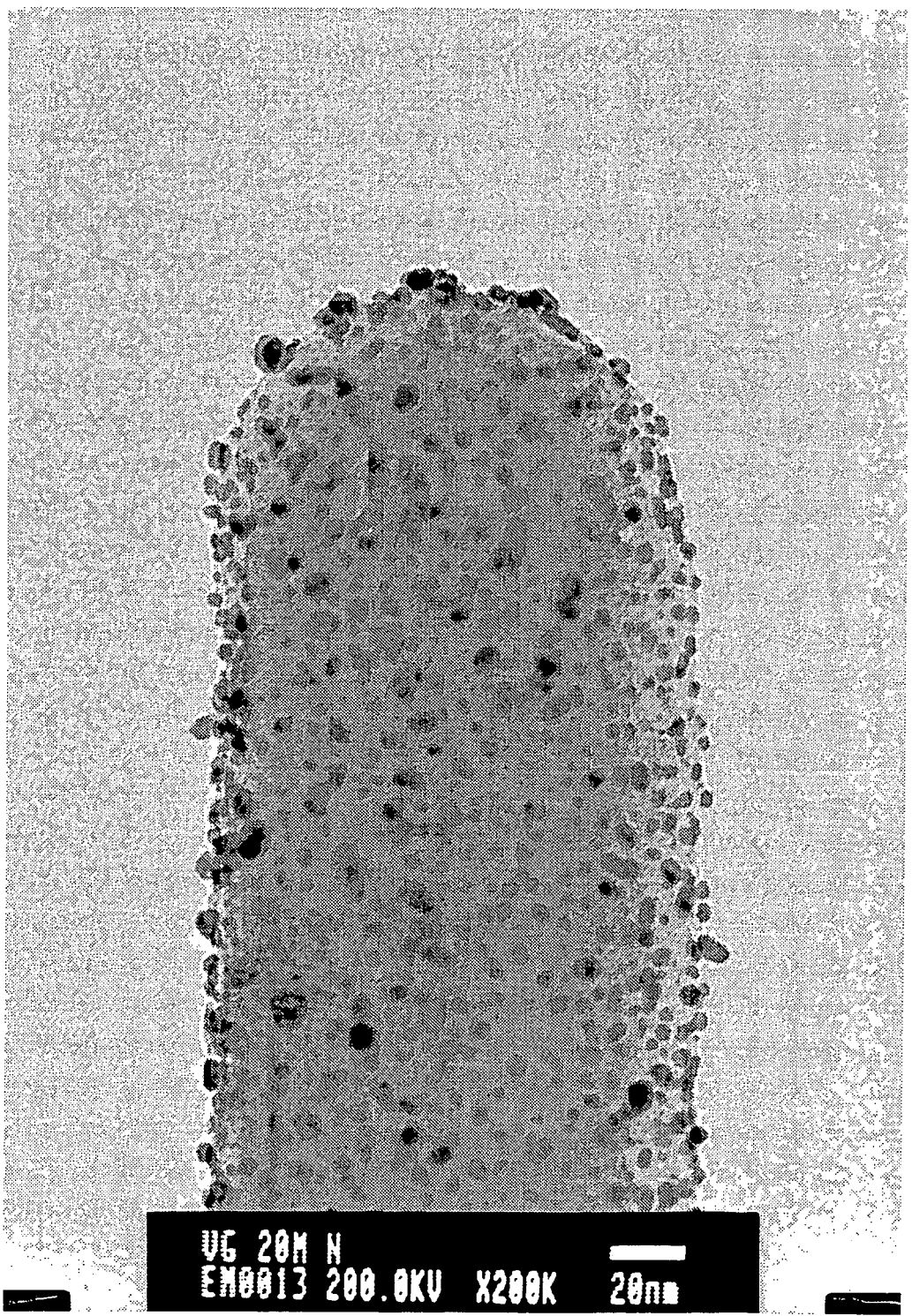
FIG. 12 is a transmission electron micrograph of the catalyst carrier according to Example 2.

5 g of vapor-grown carbon fiber having an average outer diameter of 150 nm, a specific surface area of 13 m$^2$/g and an average fiber length of 10 μm was loaded in a rotary crusher (stainless steel-made crushing blade, rotation rate: 25000 rpm) and subjected to a crushing treatment for 20 minutes. Thereafter, a specific surface area and an average fiber length of the carbon fiber were measured and, as a result, the specific surface area and the average fiber length were 24 m$^2$/g and 6.0 μm, respectively, which were 1.8 times and 0.6 times the original values, respectively. 0.2 g of the thus-crushed vapor-grown carbon fiber was dispersed in 50 ml of distilled water, 0.172 g of sodium carbonate was added and then, stirred with heat at 80° C. To the resultant dispersion, an aqueous solution containing 0.135 g of chloroplatinic acid was added dropwise, stirred for two hours and then, a 35% aqueous solution of formaldehyde was added dropwise. After stirred for one hour, the resultant solution was filtered and, then, a solid material was subjected to a drying treatment for two hours at 400° C. in an atmosphere of argon, to thereby obtain a catalyst carrier in which platinum particles were carried on a carbon fiber. A TEM photograph thereof is shown in FIG. 12.

Further, diameters of the platinum catalyst were measured by observing the TEM photograph, to thereby obtain a distribution of the diameters. As a result, an average diameter of the platinum catalyst particles was 5 nm.

Example 3

Figure 13:
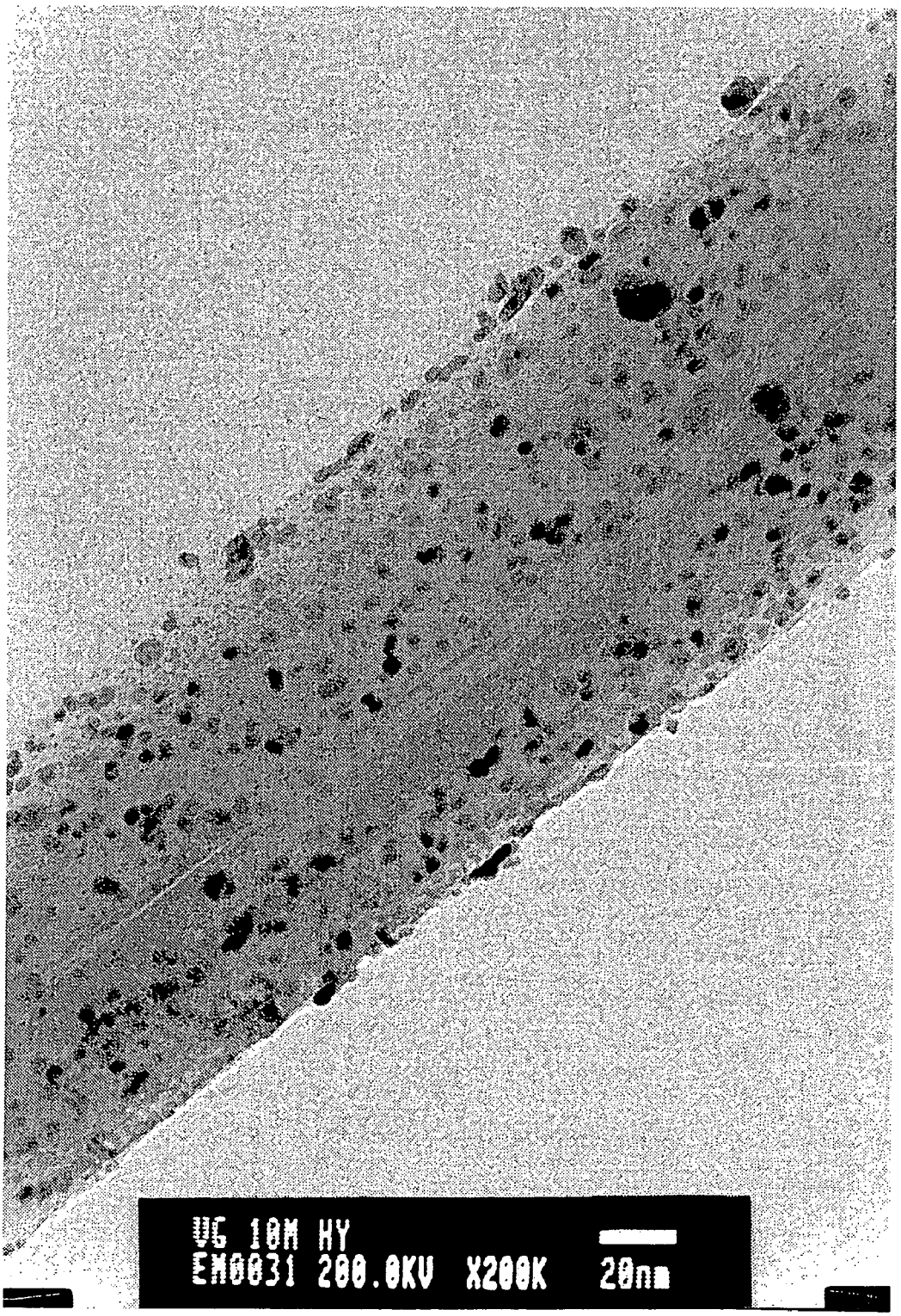
FIG. 13 is a transmission electron micrograph of the catalyst carrier according to Example 3.

5 g of vapor-grown carbon fiber having an average outer diameter of 150 nm, a specific surface area of 13 m$^2$/g and an average fiber length of 10 μm was loaded in a rotary crusher (stainless steel-made crushing blade, rotation rate: 25000 rpm) and subjected to a crushing treatment for 10 minutes. Thereafter, a specific surface area and an average fiber length of the carbon fiber were measured and, as a result, the specific surface area and the average fiber length were 18 m$^2$/g and 7.5 μm, respectively, which were 1.6 times and 0.75 times the original values, respectively. 0.2 g of the thus-crushed vapor-grown carbon fiber was, after being heated in a 60% aqueous solution of nitric acid for five hours at 70° C., dispersed in 50 ml of distilled water, 0.172 g of sodium carbonate was added and the dispersion was stirred with heat at 80° C. To the resultant dispersion an aqueous solution containing 0.135 g of chloroplatinic acid was added dropwise, stirred for two hours and then, a 35% aqueous solution of formaldehyde was added dropwise. After stirred for one hour, the resultant solution was filtered and, then, a solid material was subjected to a drying treatment for two hours at 400° C. in an atmosphere of argon, to thereby obtain a catalyst carrier in which platinum particles were carried on a carbon fiber. A TEM photograph thereof is shown in FIG. 13.

Further, diameters of the platinum catalyst were measured by observing the TEM photograph, to thereby obtain a distribution of the diameters. As a result, an average diameter of the platinum catalyst particles was 6 nm.

Example 4

Figure 14:
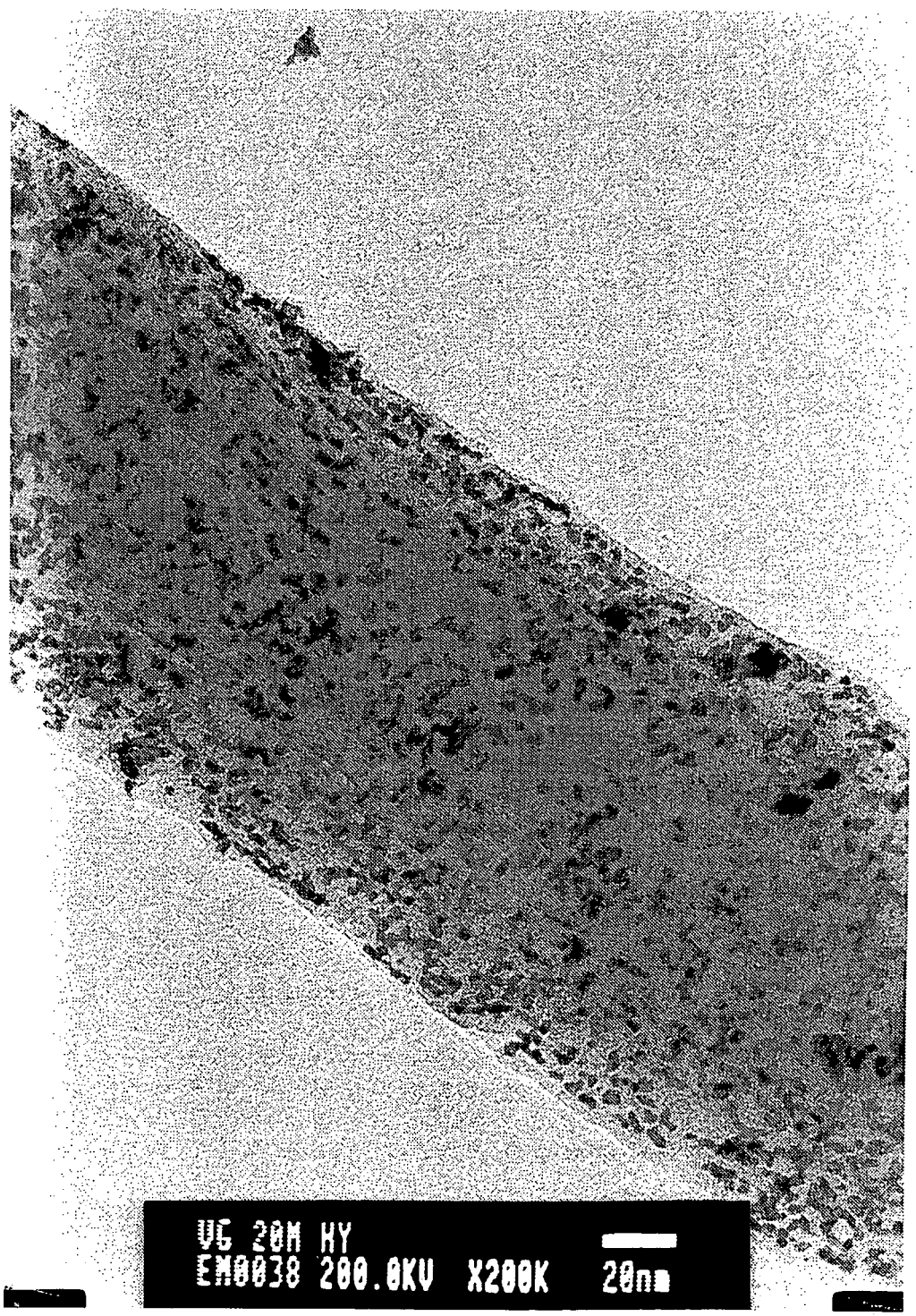
FIG. 14 is a transmission electron micrograph of the catalyst carrier according to Example 4.

5 g of vapor-grown carbon fiber having an average outer diameter of 150 nm, a specific surface area of 13 m$^2$/g and an average fiber length of 10 μm was loaded in a rotary crusher (stainless steel-made crushing blade, rotation rate: 25000 rpm) and subjected to a crushing treatment for 20 minutes. Thereafter, a specific surface area and an average fiber length of the carbon fiber were measured and, as a result, the specific surface area and the average fiber length were 24 m$^2$/g and 6.0 μm, respectively, which were 1.8 times and 0.6 times the original values, respectively. 0.2 g of the thus-crushed vapor-grown carbon fiber was, after being heated in a 60% aqueous solution of nitric acid for five hours at 70° C., dispersed in 50 ml of distilled water, 0.172 g of sodium carbonate was added and the dispersion was stirred with heat at 80° C. To the resultant dispersion an aqueous solution containing 0.135 g of chloroplatinic acid was added dropwise, stirred for two hours and then, a 35% aqueous solution of formaldehyde was added dropwise. After stirred for one hour, the resultant solution was filtered and, then, a solid material was subjected to a drying treatment for two hours at 400° C. in an atmosphere of argon, to thereby obtain a catalyst carrier in which platinum particles were carried on a carbon fiber. A TEM photograph thereof is shown in FIG. 14.

Further, diameters of the platinum catalyst were measured by observing the TEM photograph, to thereby obtain a distribution of the diameters. As a result, an average diameter of the platinum catalyst particles was 3 nm.

Comparative Example 1

Figure 15:
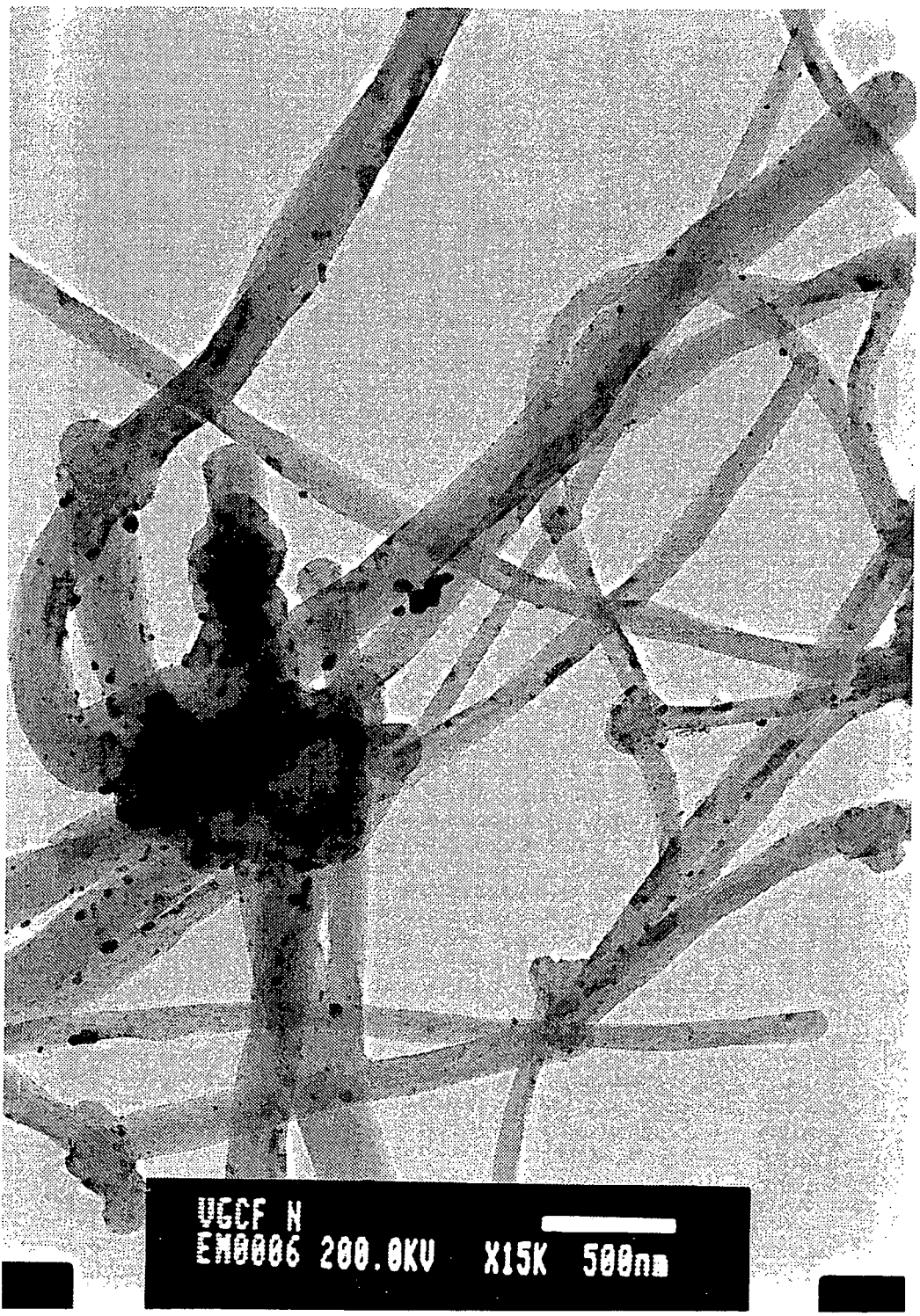
FIG. 15 is a transmission electron micrograph of the catalyst carrier according to Comparative Example 1.

Same operations were performed as in Example 1 except that the crushing treatment was not performed, to thereby obtain a catalyst carrier in which platinum particles were carried on the carbon fiber. A TEM photograph thereof is shown in FIG. 15. Further, diameters of the platinum catalyst were measured by observing the TEM photograph, to thereby obtain a distribution of the diameters. As a result, an average diameter of the platinum catalyst particles was 19 nm.

Comparative Example 2

Figure 16:
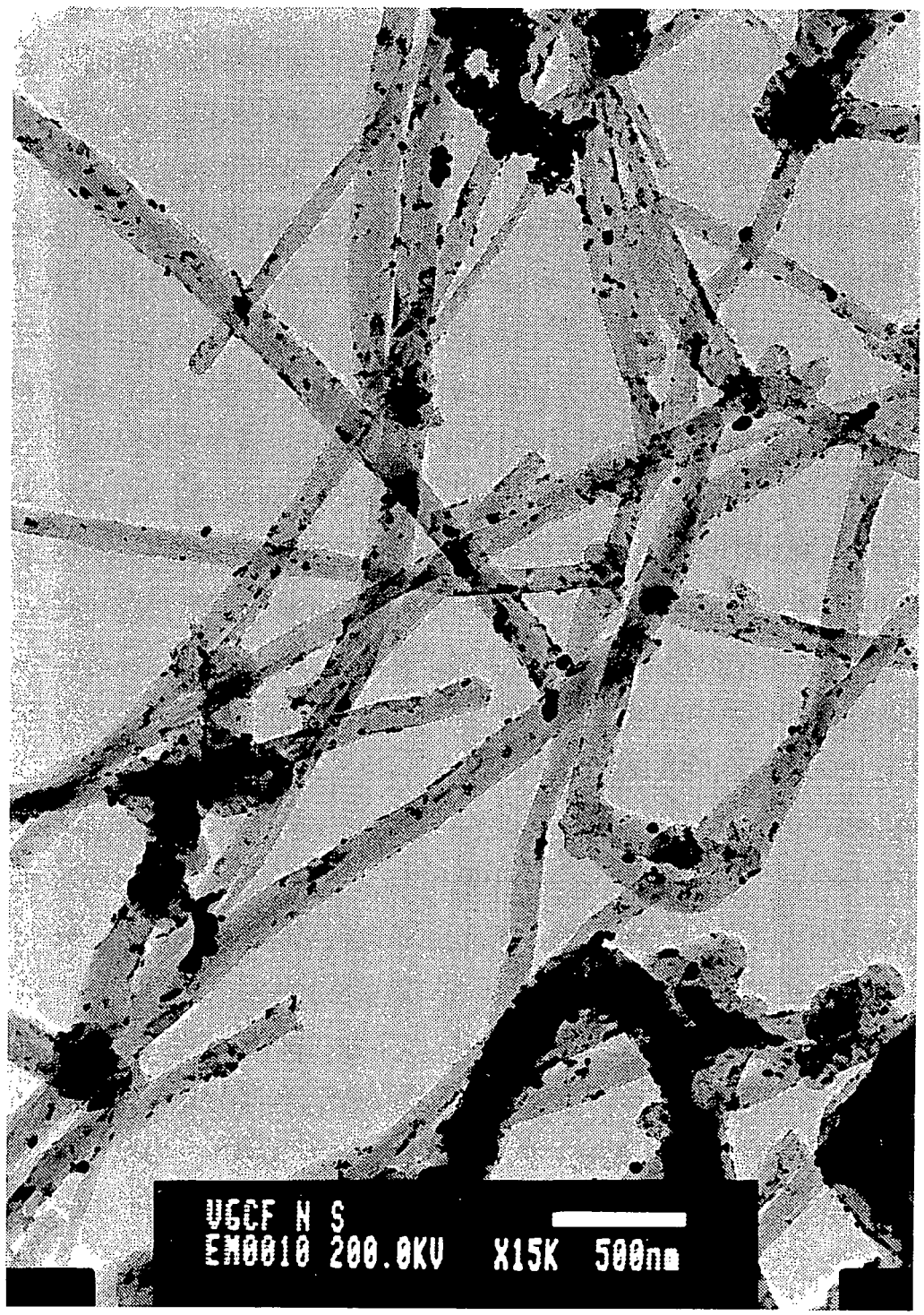
FIG. 16 is a transmission electron micrograph of the catalyst carrier according to Comparative Example 2.

Same operations were performed as in Example 3 except that the crushing treatment was not performed, to thereby obtain a catalyst carrier in which platinum particles were carried on the carbon fiber. A TEM photograph thereof is shown in FIG. 16. Further, diameters of platinum catalyst were measured by observing the TEM photograph, to thereby obtain a distribution of the diameters. As a result, an average diameter of the platinum catalyst particles was 23 nm.

Comparative Example 3

Figure 17:
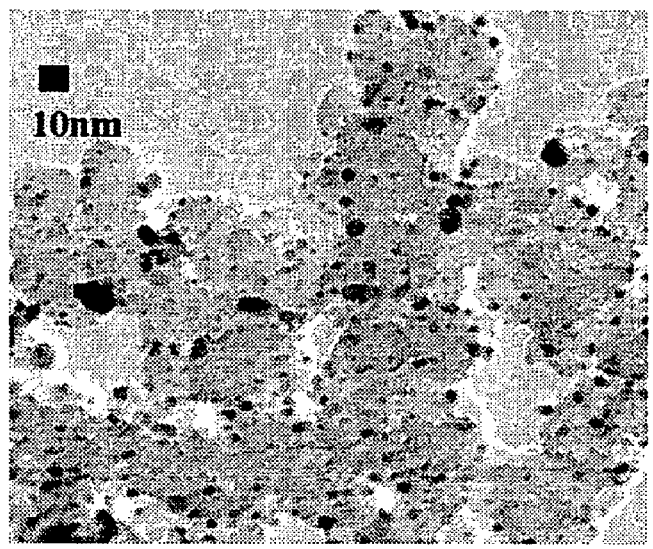
FIG. 17 is a transmission electron micrograph of the catalyst carrier according to Comparative Example 3.

Carbon black available in the market (under the name of Vulcan XC-72R manufactured by Cabot Inc. having a specific surface area of 230 m²/g) was used as it was. 0.2 g thereof was, after being heated for five hours at 70° C. in a 60% aqueous solution of nitric acid, dispersed in 50 ml of distilled water, sodium carbonate was added and the dispersion was stirred with heat at 80° C. An aqueous solution containing 0.135 g of chloroplatinic acid was added dropwise thereto, and the resultant dispersion was stirred for two hours and then, a 35% aqueous solution of formaldehyde was added dropwise. After stirred for one hour, the resultant solution was filtered and then, a solid material was subjected to a drying treatment for two hours at 400° C. in an atmosphere of argon, to thereby obtain a catalyst carrier in which platinum particles were carried on carbon black. A TEM photograph thereof is shown in FIG. 17.

Further, diameters of the platinum catalyst were measured by observing the TEM photograph, to thereby obtain a distribution of the diameters. As a result, an average diameter of the platinum catalyst particles was 2 nm.

TABLE 1

Treating conditions and powder characteristics

| | Time (min.) | Specific Surface Area (m²/g) | Hydrophilization treatment | Average diameter of platinum particles (nm) |
|---|---|---|---|---|
| Example 1 | 10 | 18 | Not performed | 8 |
| Example 2 | 20 | 24 | Not performed | 5 |
| Example 3 | 10 | 18 | Performed | 6 |
| Example 4 | 20 | 24 | Performed | 3 |
| Comparative Example 1 | | 13 | Not performed | 19 |
| Comparative Example 2 | | 13 | Performed | 23 |
| Comparative Example 3 | | 230 | Performed | 2 |

Experiment Example

Electrochemical Measurement

Each of the catalyst carriers prepared according to Examples 1 to 4 and Comparative Examples 1 to 3 was mixed with a NAFION solution and the resultant mixture was applied on a carbon electrode, and an electrochemical measurement was performed by using the resultant electrode.

Activity per unit amount of a catalyst metal was evaluated from Tafel plots determined by an absolute value of a current density, a logarithmic number of the current density and a potential at a given voltage measured by a slow scan voltamogram (SSV). A 3-electrode type battery was used in an experiment, wherein a glassy carbon electrode was used as a working electrode, a platinum electrode as a counter electrode, and a hydrogen electrode as a reference electrode.

As for a measurement condition, a current value was measured while a voltage was changed from 1.2 V to 0.4 V at a scanning rate of 1 mV/sec. In order to standardize the thus-measured current values to be a current density (mA/cm²), a surface area of the electrode was obtained by using a cyclic voltammetry. The measurement of the surface area of the electrode was conducted with reference to a method as described in Denkikagaku Sokuteiho (Electrochemical Measuring Method) (Vol. I), Gihodo Shuppan Co., Ltd., p 88.

Results are shown in Table 2. The order of the absolute values of the current density at a voltage of 0.5 V in Examples was as follows: Example 2>Example 1>Example 3=Example 4>Comparative Example 1=Comparative Example 2>>Comparative Example 3.

Figure 18:
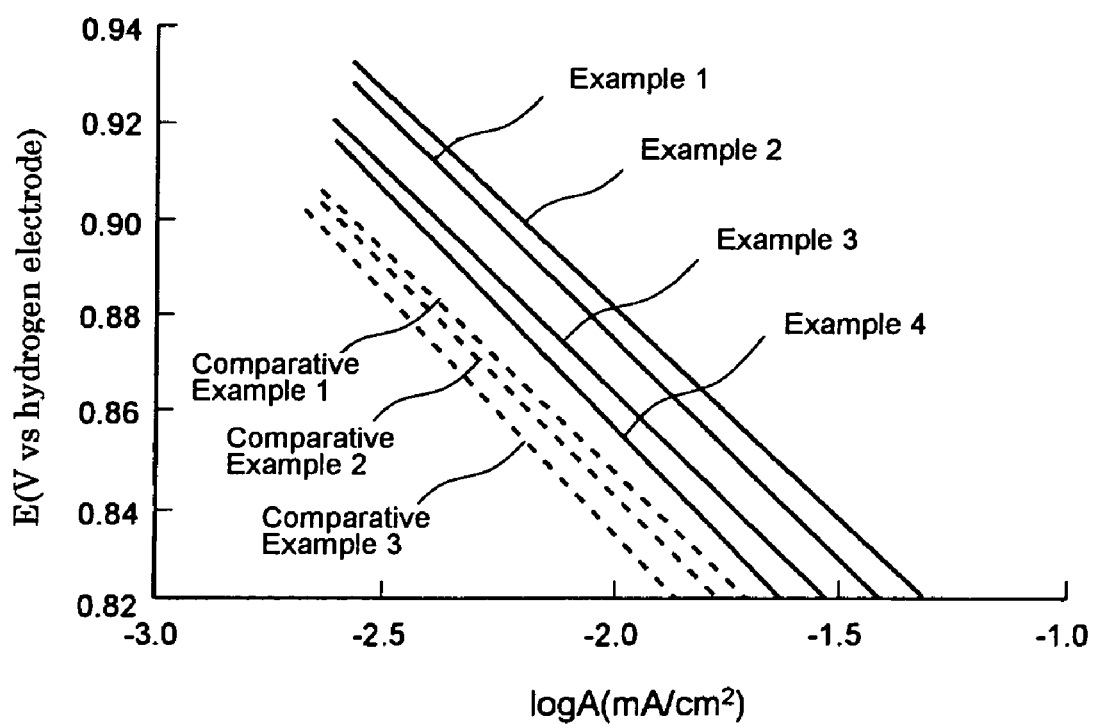
FIG. 18 is a graph showing Tafel plots of fuel batteries using catalyst carriers according to Examples 1 to 4 and Comparative Examples 1 to 3.

Further, Tafel plots determined by a logarithmic number of current density at a voltage of from 0.82 V to 0.94 V and the voltage are shown in FIG. 18. As is apparent from FIG. 18, it is found that, when any one of the catalysts in Examples 1 to 4 was used in such a voltage range as described above, a higher current density was able to be obtained compared with a case in which any one of the catalysts in Comparative Examples was used and, accordingly, a catalyst performance has been enhanced.

TABLE 2

Current density (mA/cm²) by SSV measurement

| | −0.7 V | −0.6 V | −0.5 V |
|---|---|---|---|
| Example 1 | −0.2 | −0.3 | −0.4 |
| Example 2 | −0.3 | −0.4 | −0.5 |
| Example 3 | −0.2 | −0.2 | −0.3 |
| Example 4 | −0.2 | −0.2 | −0.3 |
| Comparative Example 1 | −0.15 | −0.2 | −0.2 |
| Comparative Example 2 | −0.15 | −0.2 | −0.2 |
| Comparative Example 3 | −0.05 | −0.06 | −0.06 |

The invention claimed is:

1. A catalyst carrier used for a fuel cell, being characterized in that a catalyst metal having an average grain diameter of 15 nm or less for promoting an oxidation-reduction reaction is carried on a vapor-grown carbon fiber having an average outer diameter of from 15 nm to 500 nm, which carbon fiber is a crushed carbon fiber having a BET specific surface area of from 4 m²/g to 100 m²/g and an aspect ratio of from 1 to 200.

2. The catalyst carrier as claimed in claim 1, wherein a ratio of an average fiber length after the crushing treatment to an average fiber length before the crushing treatment is 0.8 or less.

3. The catalyst carrier as claimed in claim 1, wherein a ratio of a specific surface area after the crushing treatment to a specific surface area before the crushing treatment is 1.1 or more.

4. The catalyst carrier as claimed in claim 1, wherein the vapor-grown carbon fiber is a carbon fiber comprising a branched vapor-grown carbon fiber.

5. The catalyst carrier as claimed in claim 1, wherein the catalyst metal is at least one metal selected from the group consisting of platinum and transition metals belonging to the groups IV and V in the periodic table or any one of alloys thereof.

6. The catalyst carrier as claimed in claim 1, wherein the crushing treatment is dry crushing using impact force.

7. The catalyst carrier as claimed in claim 6, wherein the dry crushing treatment is carried out using a rotary crusher.

8. The catalyst carrier as claimed in claim 7, wherein the dry crushing is carried out in an atmosphere having 5% volume or more of oxygen concentration.

9. The catalyst carrier as claimed in claim 7, wherein the dry crushing is carried out in an atmosphere having 5% volume or more of oxygen concentration.

10. The catalyst carrier as claimed in claim 1, wherein the vapor-grown carbon fiber is a crushed and graphitized carbon fiber.

11. The catalyst carrier as claimed in claim 1, wherein the vapor-grown carbon fiber has an average fiber length of from 2 to 100 μm, and the vapor-grown carbon fiber has a multi-layer structure which comprises a discontinuous surface or a closed surface at an end portion of the fiber and a hollow space.

* * * * *